US007207703B2

(12) United States Patent
Iwasaki

(10) Patent No.: US 7,207,703 B2
(45) Date of Patent: Apr. 24, 2007

(54) HEADLAMP UNIT FOR VEHICLE AND HEADLAMP UNIT ASSEMBLY

(75) Inventor: Kazunori Iwasaki, Isehara (JP)

(73) Assignee: Ichikoh Industries, Ltd. (JP)

( * ) Notice: Subject to any disclaimer, the term of this patent is extended or adjusted under 35 U.S.C. 154(b) by 79 days.

(21) Appl. No.: 11/131,789

(22) Filed: May 18, 2005

(65) Prior Publication Data

US 2005/0259431 A1 Nov. 24, 2005

(30) Foreign Application Priority Data

May 18, 2004 (JP) ............................. 2004-148287

(51) Int. Cl.
*B60Q 1/00* (2006.01)

(52) U.S. Cl. ....................................................... 362/507

(58) Field of Classification Search ................ 362/507, 362/517, 518, 538, 540, 544, 545, 299, 300, 362/346, 347
See application file for complete search history.

(56) References Cited

U.S. PATENT DOCUMENTS

2004/0160783 A1* 8/2004 Tatsukawa et al. ......... 362/507
2004/0228139 A1* 11/2004 Taniuchi ..................... 362/539

FOREIGN PATENT DOCUMENTS

JP 2003-229006 8/2003

* cited by examiner

*Primary Examiner*—Sandra O'Shea
*Assistant Examiner*—Mark Tsidulko
(74) *Attorney, Agent, or Firm*—Kilpatrick Stockton LLP

(57) ABSTRACT

A headlamp unit for a vehicle has two LEDs, two sub-reflectors, a main reflector and a convex lens. The sub-reflector reflects light emitted by the LED and has a reflective surface and an opening. The reflective surface is a part of an ellipsoid of revolution having a first focus position located to the LED and a second focus position located on an upper side of an optical axis. The opening is formed on an upper portion of the sub-reflector so as to substantially coincide with a horizontal plane including the optical axis. The main reflector is disposed so as to be opposed to the sub-reflectors and reflects light reflected by the sub-reflectors. The convex lens forward outputs light reflected by the main reflector to present a desired light distribution pattern.

14 Claims, 9 Drawing Sheets

HEADLAMP UNIT FOR VEHICLE AND HEADLAMP UNIT ASSEMBLY

CROSS REFERENCE TO RELATED APPLICATIONS

This application claims benefit of priority under 35 U.S.C § 119 to Japanese Patent Application No. 2004-148287, filed on May 18, 2004, the entire contents of which are incorporated by reference herein.

BACKGROUND OF THE INVENTION

1. Field of the Invention

The present invention relates to a headlamp unit for a vehicle and more specifically to a headlamp unit for a vehicle having a structure for maintaining even lighting intensity.

2. Description of the Related Art

As shown in FIGS. 1A and 1B, a conventional headlamp unit for a vehicle is disclosed in Japanese Unexamined Patent Publication No. 2003-229006. The headlamp unit 101 comprises a light-emitting diode (LED) 102, a first reflective member 103, a second reflective member 104, a lens 105, a printed board 106 and a cover 107.

The LED 102 is mounted on the printed board 106. The LED 102 emits light around an optical axis Z forward therefrom.

The first reflective member 103 is disposed so as to surround a front side of the LED 102. The first reflective member 103 has a main body 103*a* and a reflection coating 103*b* formed on a rear surface of the main body 103*a*. The reflection coating 103*b* is a part of an ellipsoid of revolution formed by rotating an ellipsoid around the optical axis Z, wherein the ellipsoid has a first focus position F1 located near an emitting position of the LED 102 and a second focus position F2 located out of the optical axis Z.

The second reflective member 104 is disposed so as to be opposed to the first reflective member 103. The second reflective member 104 has a main body 104*a* and a reflection coating 104*b* formed on a front surface of the main body 104*a*. The reflection coating 104*b* is a part of a paraboloid of revolution formed by rotating a parabola around a rotation axis parallel to the optical axis Z, wherein the parabola has a focus position located near the second focus position F2 and the rotation axis passes the focus position.

The lens 105 is annularly disposed to a front side of the second reflective member 104 in order to focus an annularly-shaped beam reflected by the reflection coating 104*b* and control a distribution of the annularly-shaped beam. The cover 107 is made of a transparent member and mounted to a front side of the lens 105 so as to cover it.

When the LED 102 emits light, the light is reflected by the reflection coating 103*b* and then focused in the first focus position F1. The light is reflected by the reflection coating 104*b* and then moves forward as a parallel beam. When the parallel beam enters the lens 105, the parallel beam is focused and distribution-controlled to be emitted in front of the vehicle.

However, the headlamp unit 101 lacks compatibility as a headlamp because it has a non-emission region in a center portion of the cover 107 (see FIG. 1A). The headlamp unit 101 also lacks even lighting intensity because it comprises one LED. These lead to poor visibility.

Further, a lack of lighting intensity causes a plurality of the headlamp assemblies 101 to be installed on the vehicle because the headlamp unit 101 comprises one LED. This leads to a large sized headlamp unit assembly.

SUMMARY OF THE INVENTION

An object of the present invention is to provide a headlamp unit for a vehicle having a structure for maintaining even lighting intensity and realizing a small sized headlamp unit assembly.

In order to achieve the above object, the present invention provides a headlamp unit for a vehicle comprising: a plurality of LEDs; a plurality of sub-reflectors respectively provided with the plurality of the LEDs, wherein the sub-reflector reflects light emitted by the LED and has a reflective surface and an opening, the reflective surface is a part of an ellipsoid of revolution having a first focus position located to the LED and a second focus position located on an upper side of an optical axis and the opening is formed on an upper portion of the sub-reflector so as to substantially coincide with a horizontal plane including the optical axis; a main reflector disposed so as to be opposed to the sub-reflectors and reflecting light reflected by the sub-reflectors; and a convex lens forward outputting light reflected by the main reflector to present a desired light distribution pattern.

According to the present invention, if light emitted by each of the LEDs has irregular color, the headlamp unit can reduce irregular color of the outputting light as a whole because the light distribution pattern comprises light emitted by the plurality of the LEDs. Therefore, since headlamp unit has a structure for maintaining even lighting intensity, this can prevent poor visibility.

In order to achieve the above object, the present invention provides a headlamp unit assembly comprising: a lamp housing having an open front portion; a plurality of headlamp units mounted within the lamp housing such that an optical axis of each headlamp unit can be adjusted; and a glass covering the open front portion, wherein the headlamp unit comprises: a plurality of LEDs; a plurality of sub-reflectors respectively provided with the plurality of the LEDs, wherein the sub-reflector reflects light emitted by the LED and has a reflective surface and an opening, the reflective surface is a part of an ellipsoid of revolution having a first focus position located to the LED and a second focus position located on an upper side of an optical axis and the opening is formed on an upper portion of the sub-reflector so as to substantially coincide with a horizontal plane including the optical axis; a main reflector disposed so as to be opposed to the sub-reflectors and reflecting light reflected by the sub-reflectors; and a convex lens forward outputting light reflected by the main reflector to present a desired light distribution pattern.

According to the present invention, the headlamp unit can reduce space occupied by one LED in comparison with the conventional headlamp unit. Therefore, in a case where the plurality of the LEDs are installed on a vehicle, space occupied by the headlamp unit assembly can be reduced. As a result, this can realize a small sized headlamp unit assembly.

DESCRIPTION OF THE PREFERRED EMBODIMENTS

Figure 1A:
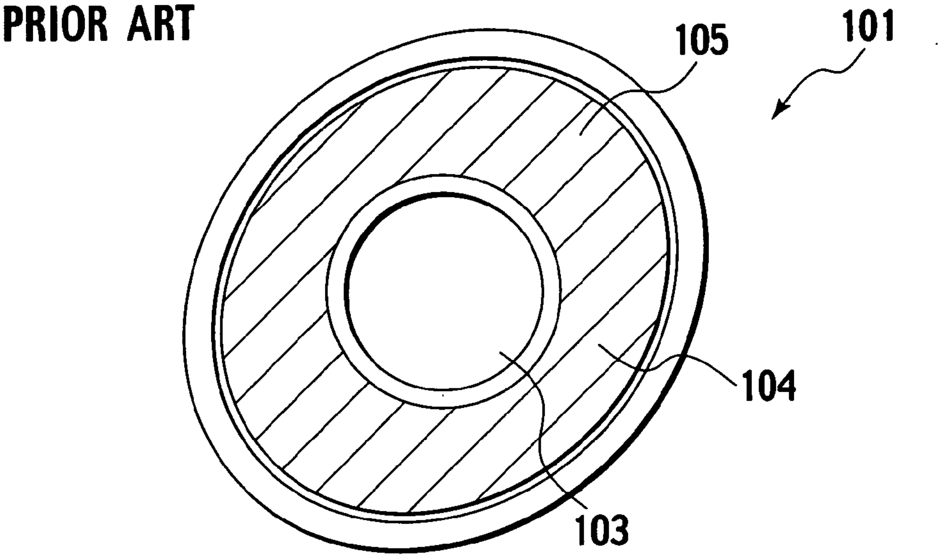
FIG.1A PRIOR ART
FIG. 1A is a plan view of a conventional headlamp unit for a vehicle.
Figure 1B:
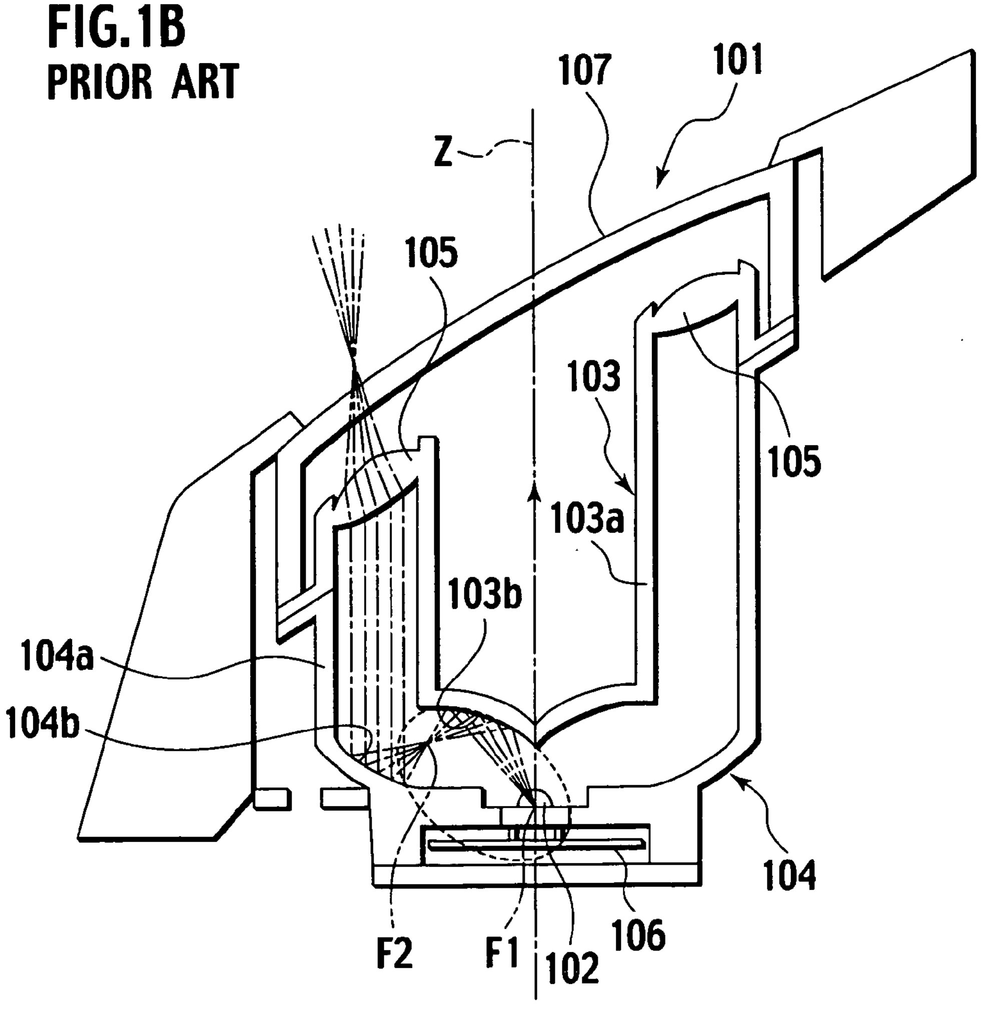
FIG.1B PRIOR ART
FIG. 1B is a longitudinal cross-sectional view of the conventional headlamp unit for a vehicle.
Figure 2:
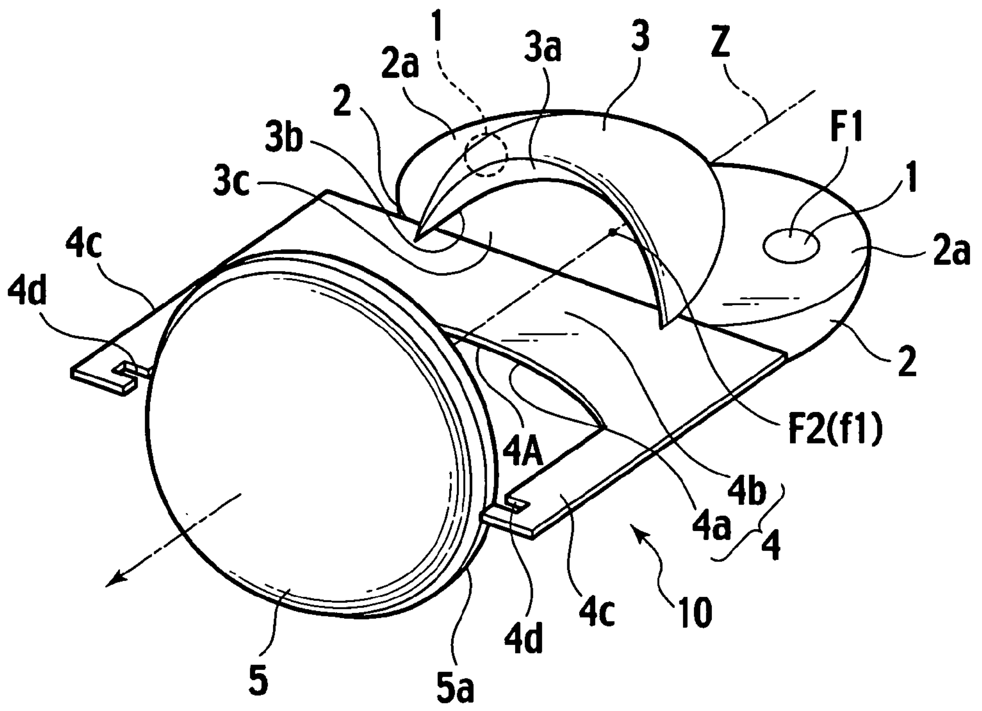
FIG. 2 is a perspective view of a headlamp unit for a vehicle of the embodiment of the present invention.
Figure 3:
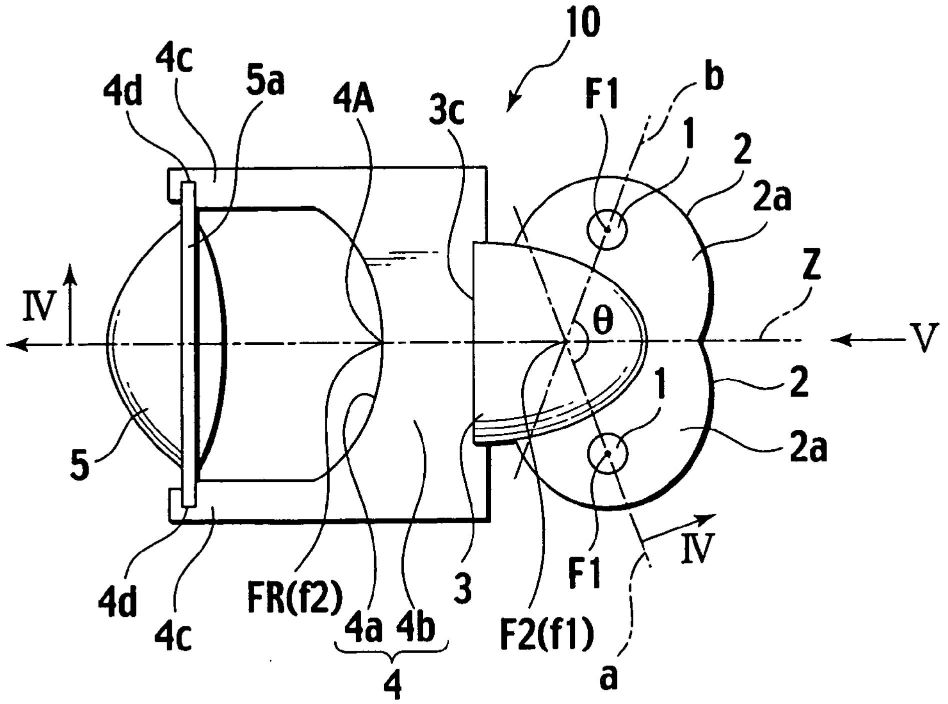
FIG. 3 is a plan view of the headlamp unit for a vehicle of the embodiment of the present invention.
Figure 4:
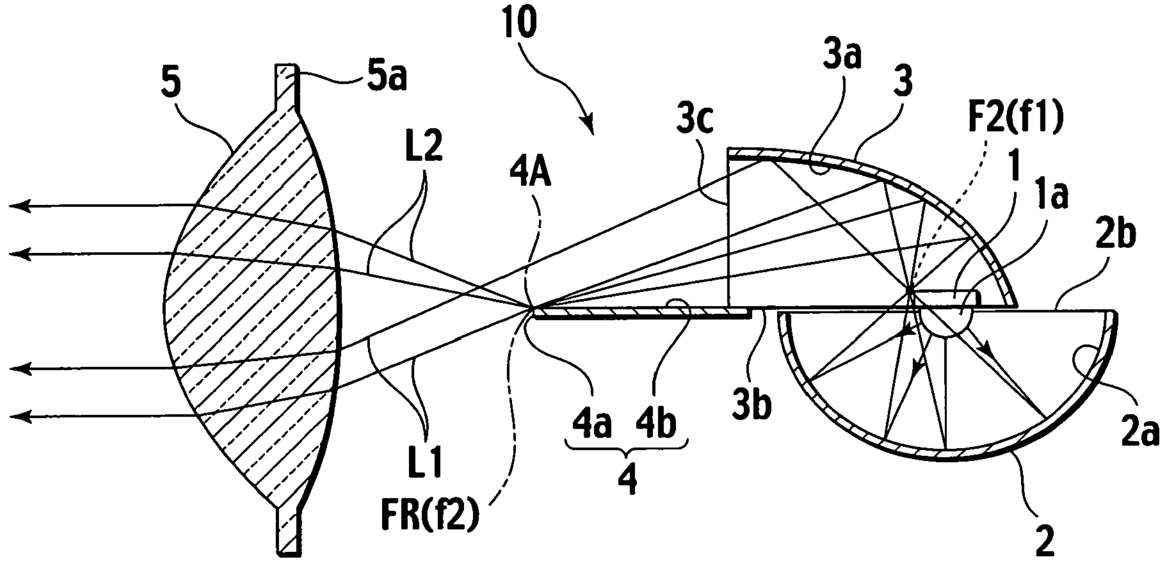
FIG. 4 is a cross-sectional view along a IV—IV line of FIG. 3.

An embodiment of the present invention will be described with reference to FIGS. 2 to 11.

As shown in FIGS. 2 to 6, a headlamp unit for a vehicle 10 comprises LEDs 1, 1, sub-reflectors 2, 2, a main reflector 3, a shade 4, a convex lens 5, screws 6, 6 and a mounting plate 9.

The LED 1 has an emission portion 1*a* and is disposed near a first focus position F1 of a first reflective surface 2*a* of the sub-reflector 2 such that the emission portion 1*a* is opposed to the first reflective surface 2*a*.

The sub-reflector 2 projects downward and is made of a thermoplastic resin such as a polycarbonate resin and an acrylic resin. One sub-reflector 2 is integrally formed with another sub-reflector 2. The sub-reflector 2 has a first reflective surface 2*a* and an opening 2*b*.

The first reflective surface 2*a* is formed on an inner surface of the sub-reflector 2 by coating or evaporating a film having reflective function on the inner surface. The first reflective surface 2*a* is a part of an ellipsoid of revolution formed by rotating an ellipsoid having the first focus position F1 and a second focus position F2. The opening 2*b* is formed on an upper portion of the sub-reflector 2. The opening 2*b* substantially coincides with a horizontal plane including the first focus position F1 and an optical axis Z of the headlamp unit 10.

The first focus position F1 of one sub-reflector 2 and the first focus position F1 of another sub-reflector 2 are disposed on both sides of the optical axis Z at a hinder part of the headlamp unit 10. The second focus position F2 of one sub-reflector 2 and the second focus position F2 of another sub-reflector 2 overlap each other and are disposed on an upper side of the optical axis Z at an anterior part of the headlamp unit 10.

The main reflector 3 projects upward and is made of a thermoplastic resin such as a polycarbonate resin and an acrylic resin. The main reflector 3 has a second reflective surface 3*a* and openings 3*b*,3*c*. The second reflective surface 3*a* is formed on an inner surface of the main reflector 3 by coating or evaporating a film having reflective function on the inner surface. The second reflective surface 3*a* is a part of an ellipsoid of revolution formed by rotating an ellipsoid having a first focus position f1 located near the second focus position F2 and a second focus position f2 located near a center portion 4A of an end 4*a* of the shade 4. The opening 3*b* is formed on a bottom portion of the main reflector 3 so as to be substantially parallel to the horizontal plane. The opening 3*b* is located on an upper side of a part of the openings 2*b*, 2*b*. The opening 3*c* is substantially semicircular-shaped at an anterior part of the main reflector 3.

The shade 4 is made of a thermoplastic resin such as a polycarbonate resin and an acrylic resin and has the end 4*a*, a reflective surface 4*b*, supporting arms 4*c*, 4*c* and lens-engaging portions 4*d*,4*d*. The end 4*a* has the center portion 4A and is formed along a meridional image surface at an anterior part of the shade 4. The reflective surface 4*b* extends from the end 4*a* toward a hinder part of the shade 4. The reflective surface 4*b* is formed on an upper surface of the shade 4 by coating or evaporating a film having reflective function on the upper surface. The supporting arms 4*c*, 4*c* extend in parallel with each other forward from both sides of an anterior part of the reflective surface 4*b*. The lens-engaging portions 4*d*, 4*d* is formed at portions, which are opposed to each other, of distal ends of the supporting arms 4*c*, 4*c*.

The convex lens 5 is a biconvex and aspherical lens and has a flange portion 5*a*. The flange portion 5*a* is made of a transparent and thermoplastic resin such as an acrylic resin and mounted on an outer circumference of the convex lens 5. The flange portion 5*a* is engaged to the lens-engaging portions 4*d*, 4*d* such that a lens focal point FR of the convex lens 5 substantially coincides with the second focus position f2 (the center portion 4A of the edge 4*a*).

Figure 6:
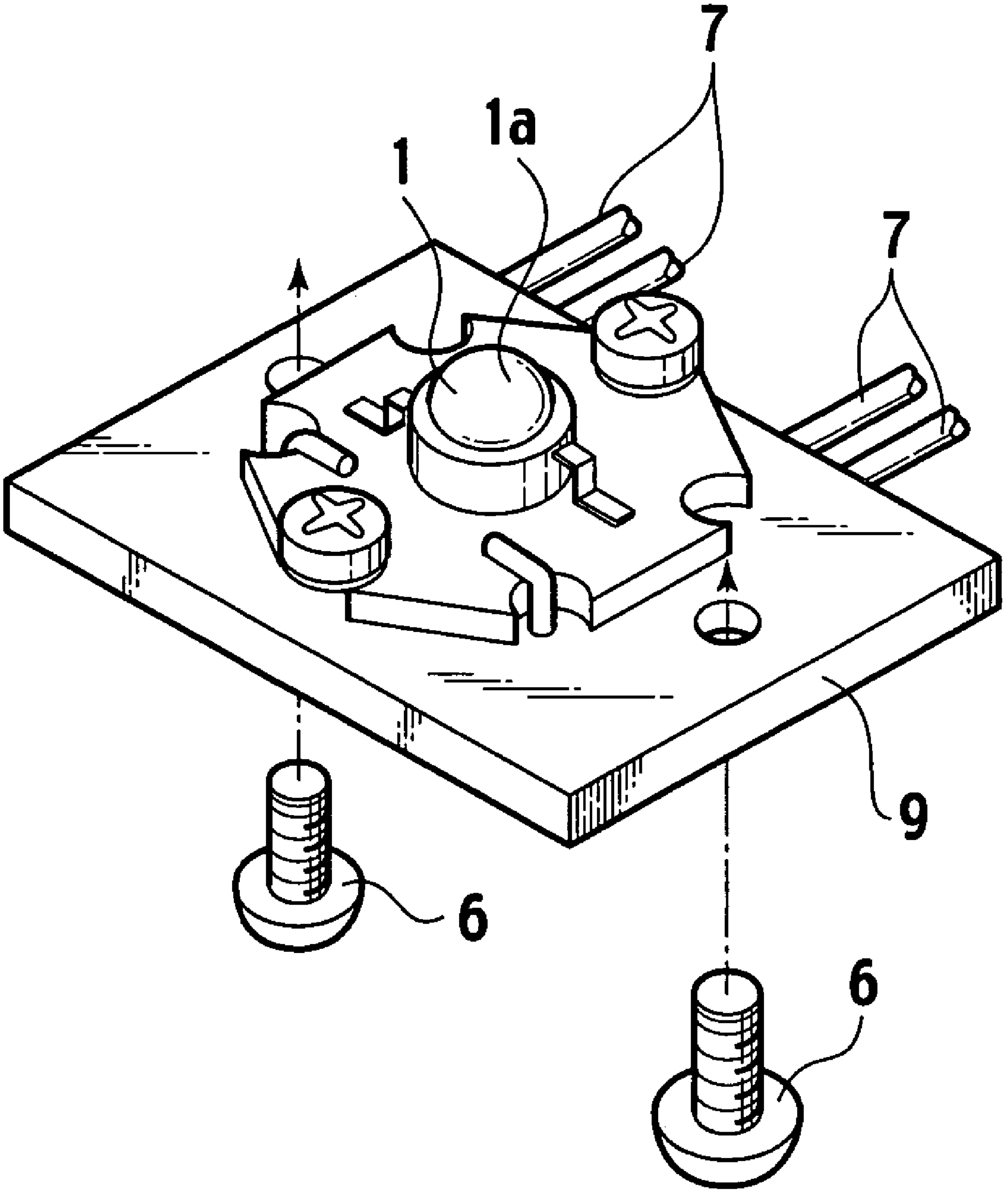
FIG. 6 is a perspective view of a mounting plate employed by the headlamp unit for a vehicle of the embodiment of the present invention.

As shown in FIG. 6, the mounting plate 9 is firmly fixed to the LED 1 in the center portion thereof and engaged to a top board (not shown) covering the opening 2*b* by means of the screws 6, 6. Leads 7, 7, 7, 7 are two leads for the LED 1 and two leads for a cooling element.

Figure 5:
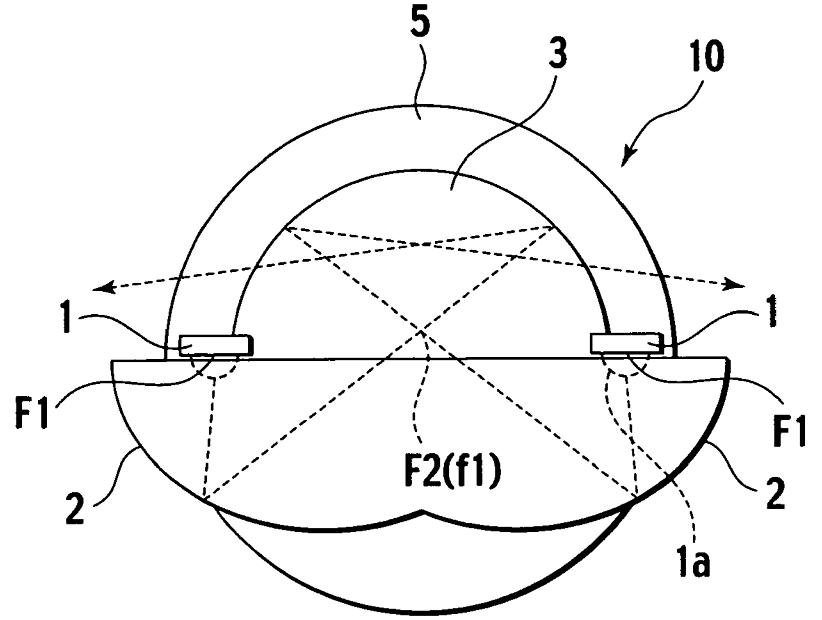
FIG. 5 is a cross-sectional view which is viewed from V of FIG. 3.

Light emitted by the LEDs 1, 1 is reflected on the first reflective surfaces 2*a*, 2*a* of the sub-reflectors 2, 2 and then focused near the first focus position f1 (see FIG. 5). The light is reflected on the second reflective surface 3*a* of the main reflector 3 and then a part of the light is focused near the second focus position f2.

One of the light L1 directly enters the convex lens 5 without being reflected by the shade 4 and the other of the light L2 is reflected on the reflective surface 4*b* of the shade 4 and then enters the convex lens 5. The light having entered the convex lens 5 is output forward the headlamp unit 10 to present a desired light distribution pattern.

The light distribution pattern is suitable a low beam having a cut line that is similar to a cross-section of the reflective surface 4*b* of the shade 4, wherein the light distribution pattern does not have a non-emission region therewithin.

Figure 7A:
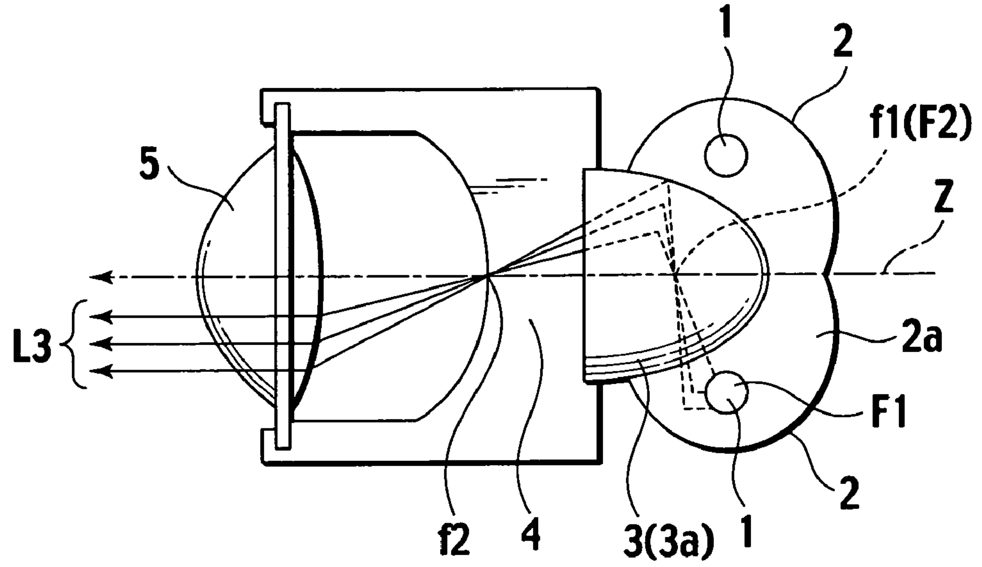
FIG. 7A is a plan view showing a light path when a LED emits, wherein the LED is located in a left side viewed from a hinder part of the headlamp unit for a vehicle of the embodiment of the present invention.

As shown in FIG. 7A, light emitted by LED 1 that is located a left side viewed from the hinder part of the headlamp unit 10 (a side of the sub-reflectors 2, 2) is output toward the first reflective surface 2*a* of the sub-reflector 2 that is located the left side. The light is reflected on the first reflective surface 2*a* and then focused near the first focus position f1 of the second reflective surface 3*a*. The light enters a right side region of the second reflective surface 3*a* of the main reflector 3. Then, the light is reflected on the second reflective surface 3*a* and then the part of the light is focused near the second focus position f2 of the second reflective surface 3*a*. One of the light L1 enters a left side region of the convex lens 5 without being reflected by the shade 4 and the other of the light L2 is reflected on the reflective surface 4*b* of the shade 4 and then enters the left side region of the convex lens 5. The light having entered the convex lens 5 is output forward the headlamp unit 10. At this time, the output light L3 presents a light distribution pattern P1 shown in FIG. 8A.

Figure 7B:
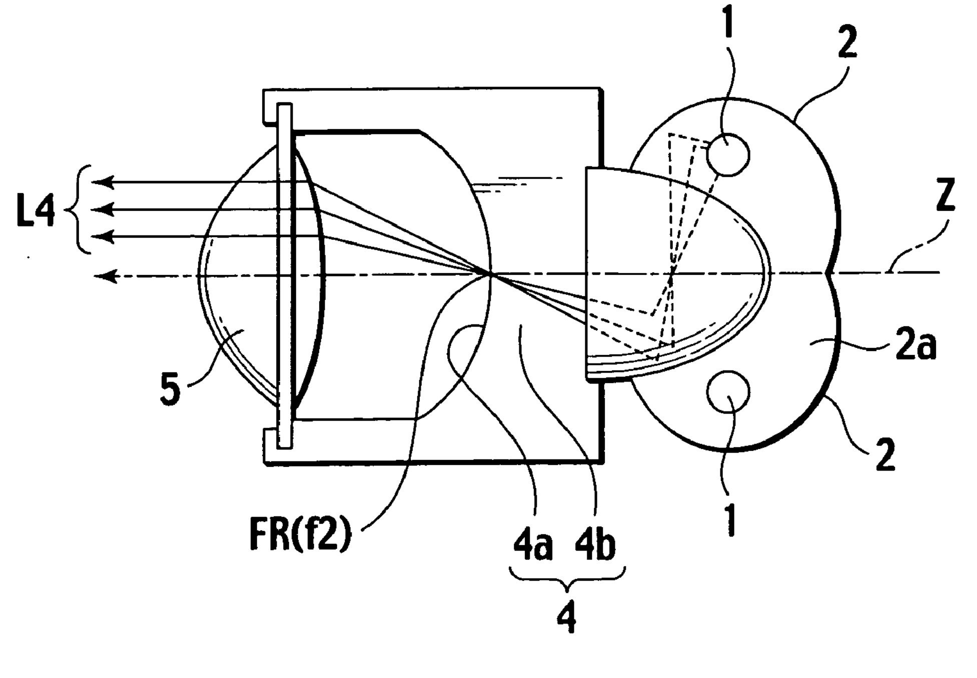
FIG. 7B is a plane view showing a light path when a LED emits, wherein the LED is located in a right side viewed from the hinder part of the headlamp unit for a vehicle of the embodiment of the present invention.
Figure 8A:
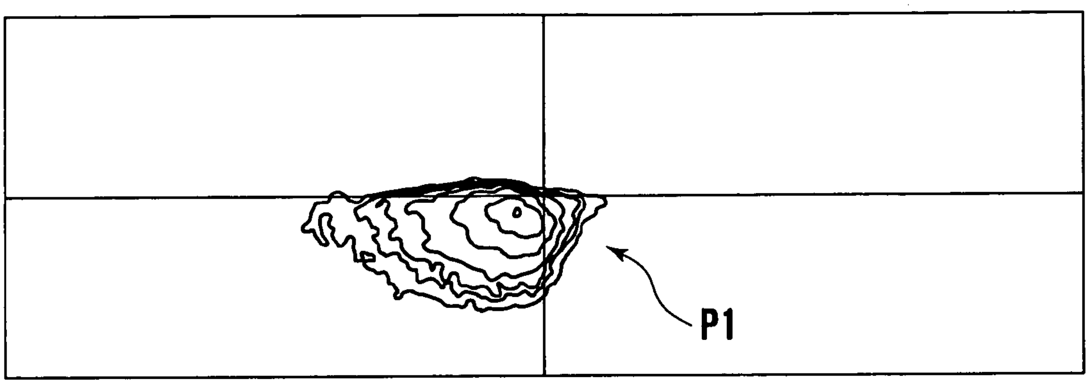
FIG. 8A is a light distribution pattern when the LED emits, wherein the LED is located in the left side viewed from the hinder part of the headlamp unit for a vehicle of the embodiment of the present invention.
Figure 8B:
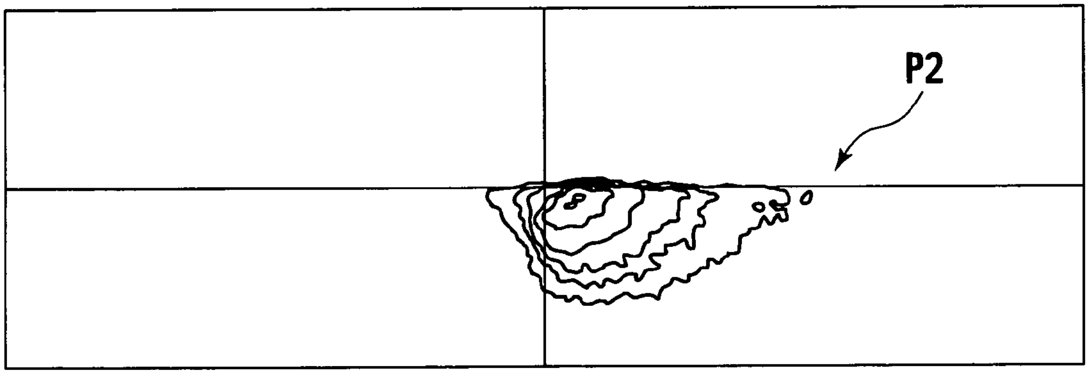
FIG. 8B is a light distribution pattern when the LED emits, wherein the LED is located in the right side viewed from the hinder part of the headlamp unit for a vehicle of the embodiment of the present invention.
Figure 8C:
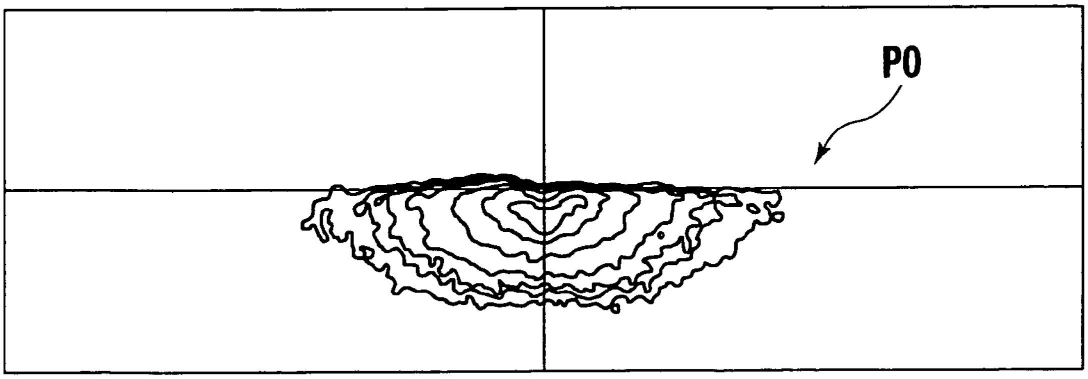
FIG. 8C is a light distribution pattern when the LEDs emit, wherein the LEDs are located in the left and right sides viewed from the hinder part of the headlamp unit for a vehicle of the embodiment of the present invention.

Also, as shown in FIG. 7B, light emitted by LED 1 that is located a right side viewed from the hinder part of the headlamp unit 10 (a side of the sub-reflectors 2, 2) is output toward the first reflective surface 2*a* of the sub-reflector 2 that is located the right side. The light is reflected on the first reflective surface 2*a* and then focused near the first focus position f1 of the second reflective surface 3*a*. The light enters a left side region of the second reflective surface 3*a* of the main reflector 3. Then, the light is reflected on the second reflective surface 3*a* and then the part of the light is focused near the second focus position f2 of the second reflective surface 3*a*. One of the light L1 enters a right side region of the convex lens 5 without being reflected by the shade 4 and the other of the light L2 is reflected on the reflective surface 4*b* of the shade 4 and then enters the right side region of the convex lens 5. The light having entered the convex lens 5 is output forward the headlamp unit 10. At this time, the output light L4 presents a light distribution pattern P2 shown in FIG. 8B.

The headlamp unit 10 forward outputs an outgoing light presenting a light distribution pattern P0 (see FIG. 8C) laying the light distribution pattern P2 on the light distribution pattern P1, when the LEDs 1, 1 light at the same time. The light distribution pattern P0 is suitable to the low beam having the cut line.

Main characters of the headlamp unit 10 will be described.

The headlamp unit 10 utilizes space more effectively in comparison with the conventional headlamp unit because the LEDs 1, 1 and the sub-reflectors 2, 2 are disposed in space under the horizontal plane including the optical axis Z and the main reflector 3 is disposed in space above the horizontal plane.

The headlamp unit 10 possesses a high-efficiency optical system comprising the first reflective surface 2*a* and the second reflective surface 3*a*. That is, although this optical system does not entirely surround the LED 1, it utilizes the beam of the LED 1 of at least 97% according to a radiation directivity of the LED 1.

If light emitted by each of the LEDs 1, 1 has irregular color, the headlamp unit 10 can reduce irregular color of the outgoing light as a whole because the light distribution pattern P0 comprises the light distribution P1 formed by the light emitted by one LED 1 and the light distribution P2 formed by the light emitted by another LED 1. Therefore, since the headlamp unit 10 has a structure for maintaining even lighting intensity, this can prevent poor visibility.

The headlamp unit 10 can reduce space occupied by one LED in comparison with the conventional headlamp unit. Therefore, in a case where a plurality of LEDs must be installed on the vehicle, space occupied by a headlamp unit assembly can be reduced. As a result, this can realize a small sized headlamp unit assembly.

Next, a light distribution pattern of a headlamp unit assembly will be described.

Figure 9:
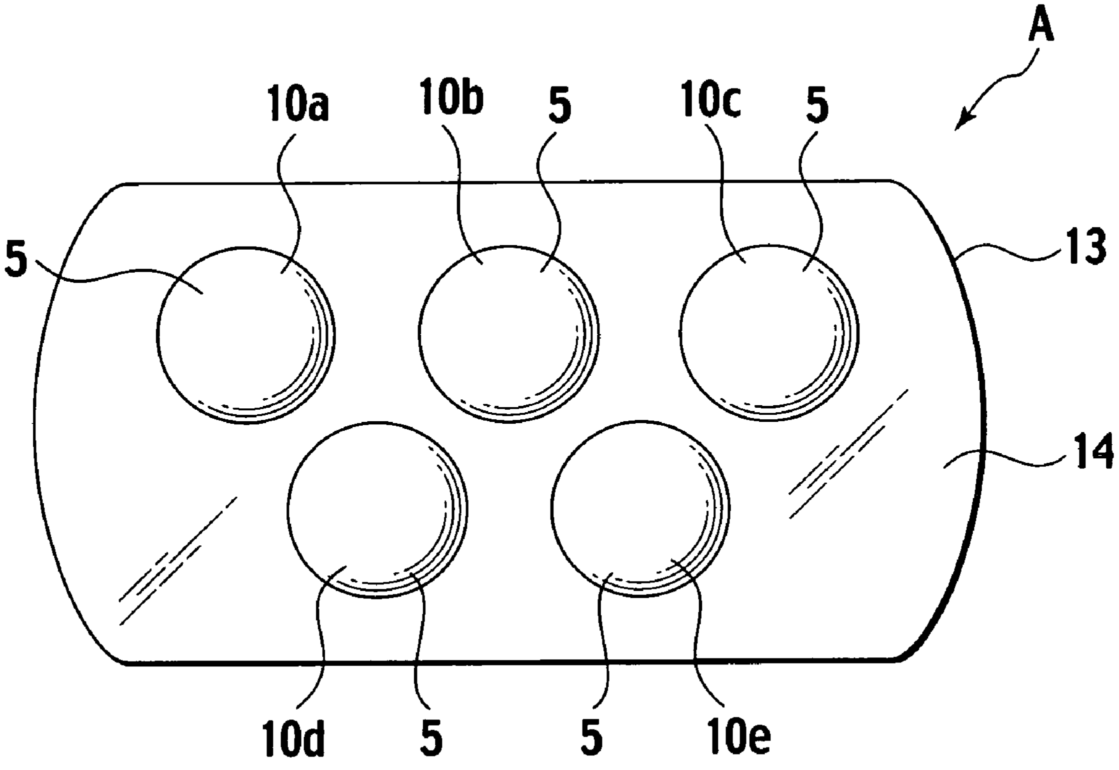
FIG. 9 is a plan view of a headlamp unit assembly of the embodiment of the present invention.

As shown in FIG. 9, a headlamp unit assembly A comprises headlamp units 10*a*, 10*b*, 10*c*, 10*d*, 10*e*, a lamp housing 13 and a glass 14. An upper row of the headlamp unit assembly A is formed with the headlamp units 10*a*, 10*b*, 10*c*. A lower row of the headlamp unit assembly A is formed with the headlamp units 10*d*, 10*e*. The headlamp units 10*a*, 10*b*, 10*c*, 10*d*, 10*e* are mounted within the lamp housing 13 having an open front portion. More specifically, the headlamp units 10*a*, 10*b*, 10*c*, 10*d*, 10*e* are mounted within the lamp housing 13 via a mounting tool provided with a pivot structure or an aiming screw such that an optical axis of each headlamp unit can be adjusted. The glass 14 covers the open front portion of the lamp housing 13.

Figure 10A:
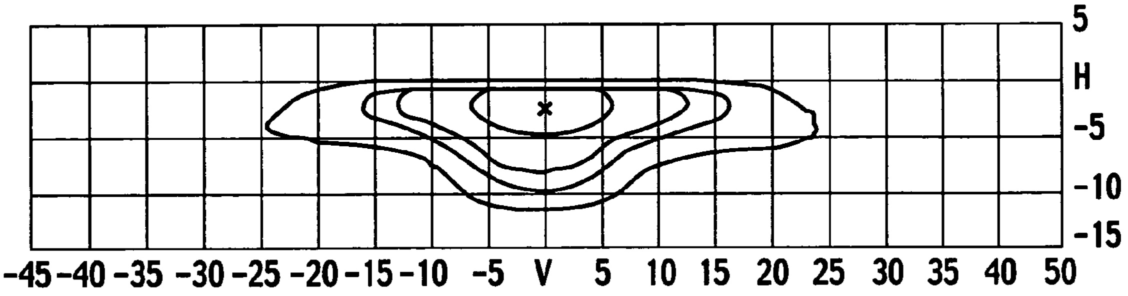
FIG. 10A is a light distribution pattern (a horizontal diffusion flat type) of a headlamp unit included in the headlamp unit assembly of the embodiment of the present invention.
Figure 10B:
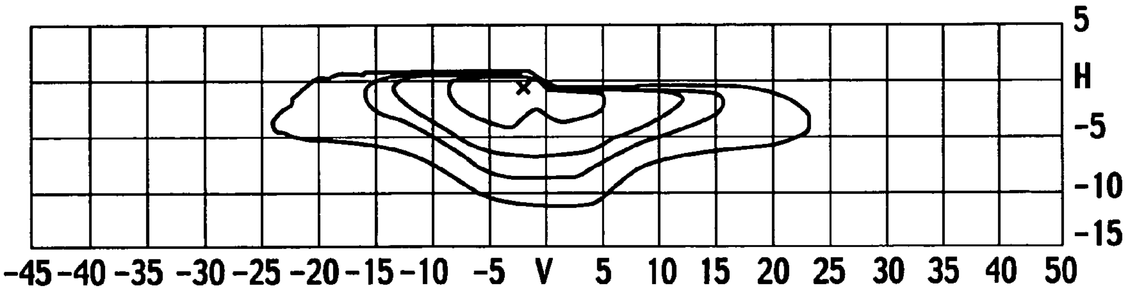
FIG. 10B is a light distribution pattern (a horizontal diffusion type having a cut line of a low beam) of a headlamp unit included in the headlamp unit assembly of the embodiment of the present invention.
Figure 10C:
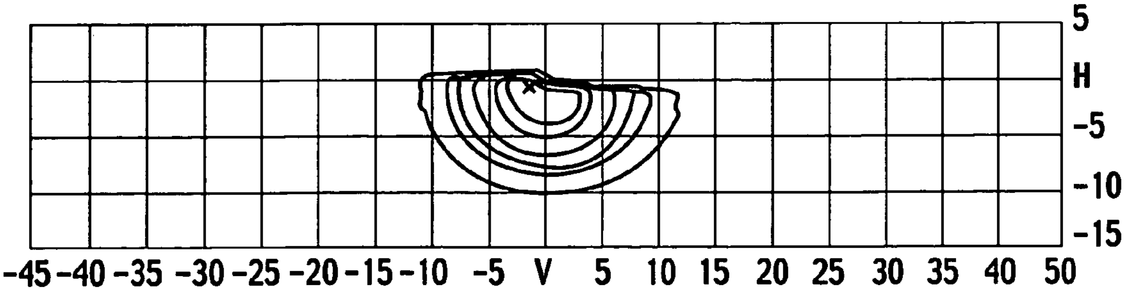
FIG. 10C is a light distribution pattern (a light condensing type having a cut line of a low beam) of a headlamp unit included in the headlamp unit assembly of the embodiment of the present invention.

FIGS. 10A, 10B, 10C are a horizontal diffusion flat type (a first light distribution pattern), a horizontal diffusion type (a second light distribution pattern) having a cut line of a low beam, a light condensing pattern (a third light distribution pattern) having a cut line of a low beam, respectively.

In the headlamp unit assembly A, one headlamp unit is configured to obtain the third light distribution pattern, two headlamp units are configured to obtain the first light distribution pattern and two headlamp units are configured to obtain the second light distribution pattern.

A flat cut line (the first light distribution pattern) is obtained by causing the reflective surface 4*b* of the shade 4 to be flat. A stepped cut line (the second and third light distribution patterns) is obtained by causing a shape of the cross-section of the reflective surface 4*b* to be a stepped shape similar to the cut line. A diffusion type (the first and second light distribution patterns) is obtained by disposing the LEDs 1, 1 such that a cross angle θ is large wherein the cross angle θ is formed between a line a and a line b passing through center points of the LEDs 1, 1 of the sub-reflector 2, 2 and the second focus positions F2, F2 of the sub-reflector 2, 2 (see FIG. 3). A light condensing type (the third light distribution pattern) is obtained by disposing the LEDs 1, 1 such that the cross angle θ is small.

Figure 11:
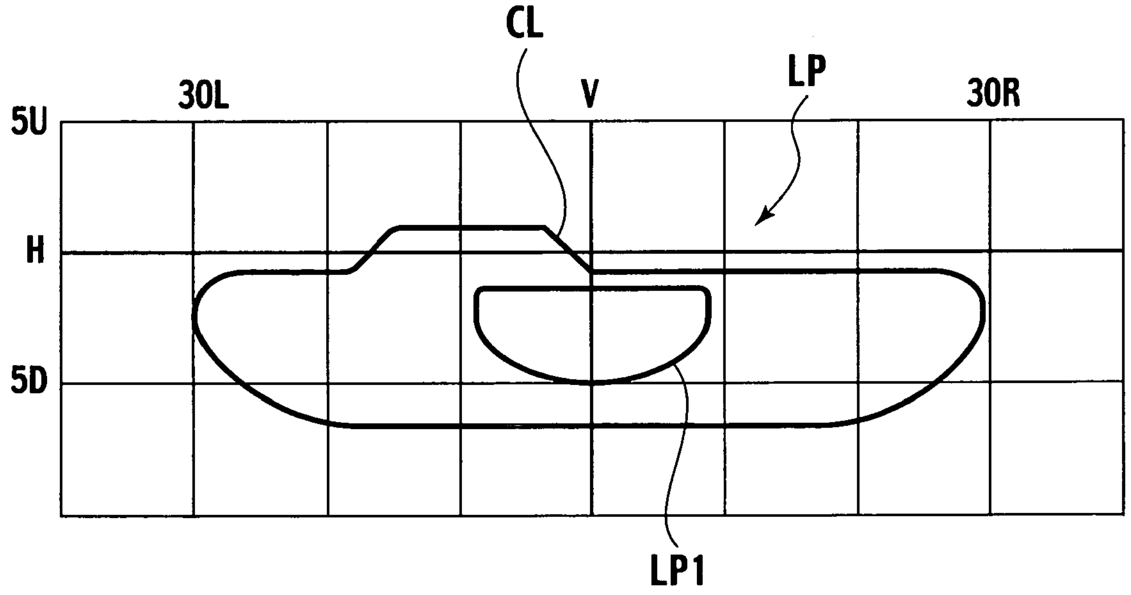
FIG. 11 is a light distribution pattern presented by the headlamp unit assembly of the embodiment of the present invention.

As shown in FIG. 11, the headlamp unit assembly A presents a light distribution pattern LP having a high illumination hot zone LP1 and a cut line CL be suitable to a low beam, in front of the vehicle.

The headlamp unit assembly A becomes to be small and reduces weight thereof because the headlamp units 10*a*, 10*b*,

10*c*, 10*d*, 10*e* are made of a resin. It is noted that the number of the sub-reflector 2 having the LED 1 may be equal or more than three.

What is claimed is:

1. A headlamp unit for a vehicle comprising:

a plurality of LEDs;

a plurality of sub-reflectors respectively provided with the plurality of the LEDs, wherein the sub-reflector reflects light emitted by the LED and has a reflective surface and an opening, the reflective surface is a part of an ellipsoid of revolution having a first focus position located to the LED and a second focus position located above an optical axis and the opening is formed on an upper portion of the sub-reflector so as to substantially coincide with a horizontal plane including the optical axis;

a main reflector disposed so as to be opposed to the sub-reflectors and reflecting light reflected by the sub-reflectors; and a convex lens forward outputting light reflected by the main reflector to present a desired light distribution pattern.

2. The headlamp unit for a vehicle according to claim 1, wherein the LED has an emitting portion opposed to the reflective surface of the sub-reflector.

3. The headlamp unit for a vehicle according to claim 1, wherein the first focus positions of the sub-reflectors are disposed at a hinder part of the headlamp unit so as not to overlap each other, the second focus positions of the sub-reflectors are disposed at an anterior part of the headlamp unit so as to overlap each other.

4. The headlamp unit for a vehicle according to claim 3, wherein the main reflector has a reflective surface and an opening, the reflective surface is a part of an ellipsoid of revolution having a first focus position located near the second focus position of the sub-reflector and the opening is formed on a bottom portion of the main reflector so as to be substantially parallel to the horizontal plane.

5. The headlamp unit for a vehicle according to claim 4, further comprising a shade engaged to the convex lens and having an end and a reflective surface, wherein the end is formed along a meridional image surface at an anterior part of the shade and the reflective surface extends from the end toward a hinder part of the shade.

6. The headlamp unit for a vehicle according to claim 5, wherein the reflective surface of the main reflector has a second focus position located near a center portion of the end.

7. The headlamp unit for a vehicle according to claim 6, wherein a lens focus of the convex lens substantially coincides with the second focus position of the main reflector.

8. The headlamp unit for a vehicle according to claim 5, wherein the shade is made of a thermoplastic resin.

9. The headlamp unit for a vehicle according to claim 5, wherein the reflective surface of the shade is formed on an upper surface of the shade by coating or evaporating a film having reflective function on the upper surface.

10. The headlamp unit for a vehicle according to claim 1, wherein the sub-reflector is made of a thermoplastic resin.

11. The headlamp unit for a vehicle according to claim 1, wherein the reflective surface of the sub-reflector is formed on an inner surface of the sub-reflector by coating or evaporating a film having reflective function on the inner surface.

12. The headlamp unit for a vehicle according to claim 1, wherein the main reflector is made of a thermoplastic resin.

13. The headlamp unit for a vehicle according to claim 1, wherein the reflective surface of the main reflector is formed on an inner surface of the main reflector by coating or evaporating a film having reflective function on the inner surface.

14. A headlamp unit assembly comprising:

a lamp housing having an open front portion;

a plurality of headlamp units mounted within the lamp housing such that an optical axis of each headlamp unit can be adjusted; and a glass covering the open front portion, wherein the headlamp unit comprises:

a plurality of LEDs;

a plurality of sub-reflectors respectively provided with the plurality of the LEDs, wherein the sub-reflector reflects light emitted by the LED and has a reflective surface and an opening, the reflective surface is a part of an ellipsoid of revolution having a first focus position located to the LED and a second focus position located on an upper side of an optical axis and the opening is formed on an upper portion of the sub-reflector so as to substantially coincide with a horizontal plane including the optical axis;

a main reflector disposed so as to be opposed to the sub-reflectors and reflecting light reflected by the sub-reflectors; and a convex lens forward outputting light reflected by the main reflector to present a desired light distribution pattern.

* * * * *